W. H. SAUNDERS.
BOTTLE HOLDER.
APPLICATION FILED NOV. 9, 1918.

1,363,168.

Patented Dec. 21, 1920.
2 SHEETS—SHEET 1.

Inventor
W. H. Saunders

By
G. Hume Talbert
Attorney

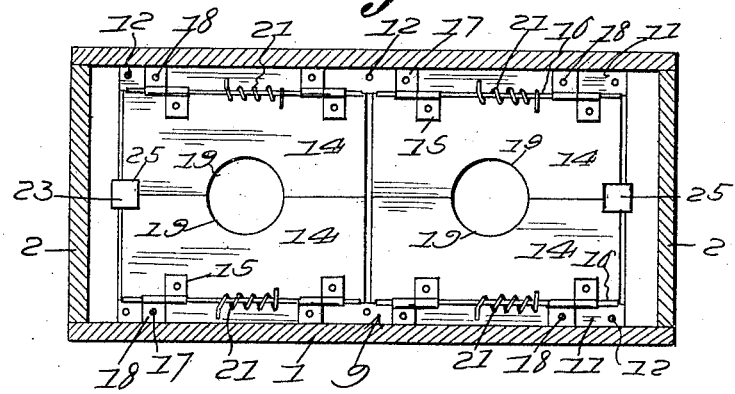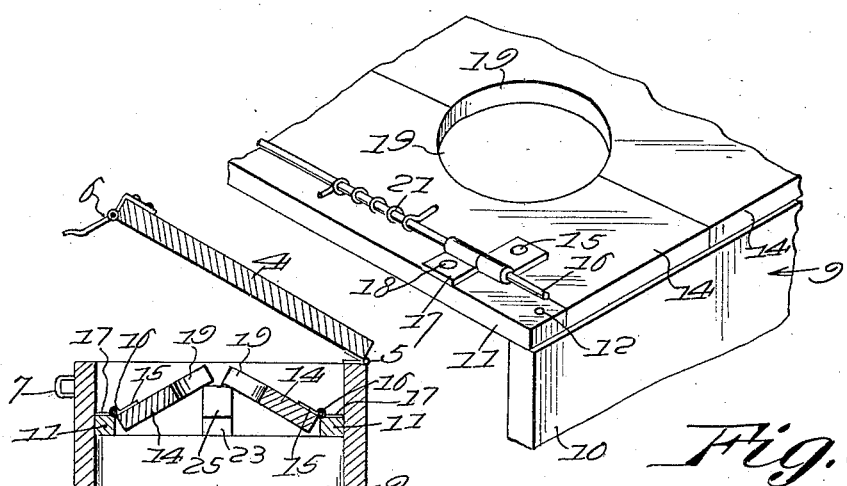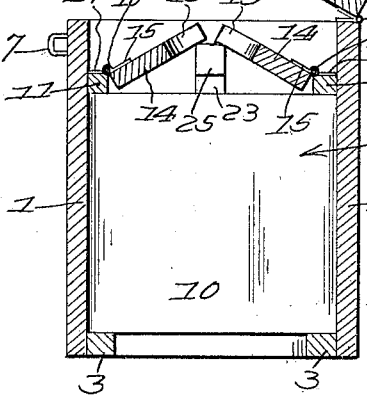

UNITED STATES PATENT OFFICE.

WILLIAM H. SAUNDERS, OF CLEVELAND, OHIO.

BOTTLE-HOLDER.

1,363,168.

Specification of Letters Patent.

Patented Dec. 21, 1920.

Application filed November 9, 1918. Serial No. 261,817.

*To all whom it may concern:*

Be it known that I, WILLIAM H. SAUNDERS, a citizen of the United States, residing at Cleveland, in the county of Cuyahoga and State of Ohio, have invented new and useful Improvements in Bottle-Holders, of which the following is a specification.

This invention comprehends generally improvements in that class of inventions known as deposit and collection receptacles, and more particularly relates to a milk bottle retainer.

This invention has for its principal aim and object to provide a device of the above mentioned character designed to receive a milk bottle or the like and subsequent to the insertion of the milk bottle therein is capable of an automatic locking engagement with the milk bottle for preventing a surreptitious removal of the milk bottle therefrom.

It is an equally important object of this invention to provide a device of the above mentioned character, the main casing or housing of which is normally locked while the retaining or locking mechanism is normally arranged in an open position so as to permit of the ready insertion or engagement of the neck of a milk bottle therewith while suitable catch means act in conjunction with the retaining means for preventing actuation of the retaining means from any point exteriorly of the main housing, thus allowing only the owner to gain access thereto by unlocking and raising the lid of the main housing when it is desired to remove the milk bottle.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:—

Fig. 3 is a transverse sectional view of the structure of Fig. 1.

Fig. 5 is a longitudinal horizontal sectional view taken just above the bottle-engaging plates.

Fig. 6 is a perspective detail showing the complemental bottle engaging plates and the manner in which they are supported at the upper end of one of the partition members.

Similar characters of reference are employed in all the above described views, to indicate corresponding parts.

Figure 1:
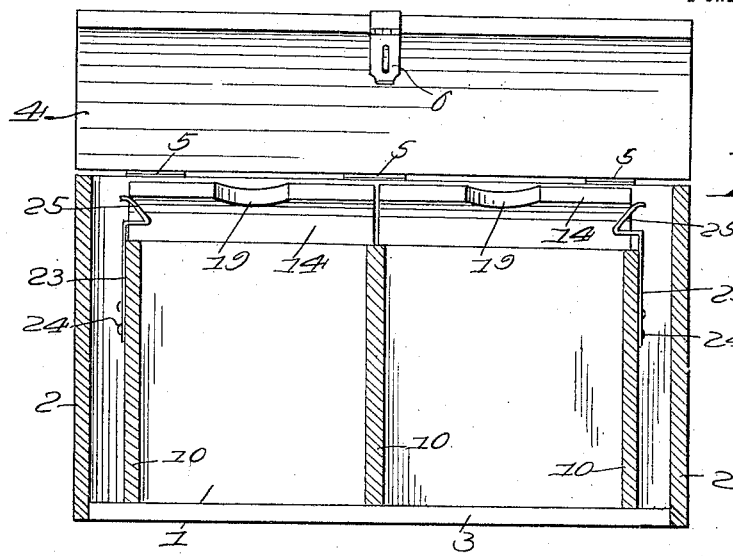
Figure 1 is a longitudinal sectional view of the invention showing the parts in an open position.
Figure 2:
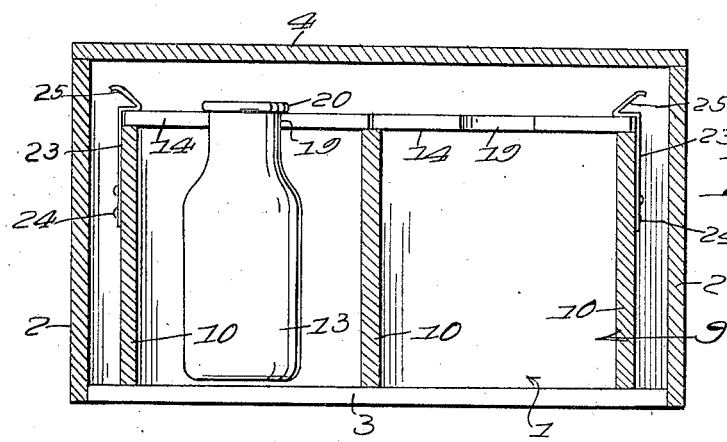
Fig. 2 is a view similar to Fig. 1 but showing the parts in closed position.
Figure 4:
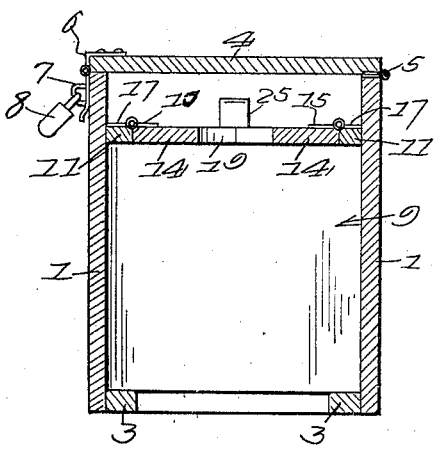
Fig. 4 is a similar view of the structure of Fig. 2.

Referring now, more particularly, to the accompanying drawings, there is provided a main outer casing or housing desirably of a rectangular configuration embodying opposed side walls 1 joined by opposed end walls 2, the bottom of the housing being open, while the lower edges of the side and end walls are bent inwardly to provide supporting flanges 3. A cover or lid 4 is hinged to one of the side walls as at 5 and carries on its free edge a hinged hasp 6 for engagement with a staple 7 and this hasp is designed to be held in a locked position by means of a padlock 8, the shackle of which engages the staple subsequent to the engagement of the hasp in position thereon.

Removably arranged within the housing or casing and supported on the flanges 3 is the improved auxiliary or secondary support generally indicated by the numeral 9. This support consists of a plurality, preferably three, of partitions 10 which are held in suitably spaced relation to each other by means of longitudinal connecting bars or strips 11 which are secured to the upper edges of the partitions by means of suitable fasteners 12 near the opposite sides thereof. The auxiliary support is designed to be inserted within the main housing, the lower edges of the partitions being supported on the flanges 3 while the upper edges of the partitions terminate short of the upper edges of the housing or casing. When in position, the end partitions are arranged in close relation with the end walls 2 of the housing or casing while the intermediate partition is positioned approximately medially of the ends of the main casing or housing and provides two compartments which open at the bottom of the main casing and are adapted to receive milk bottles.

In order to releasably retain milk bottles 13 in the compartments, opposed pairs of retaining plates 14 are employed, the inner edges carrying hinged elements or sections 15 which swingingly engage one of the shafts 16 of which there are two, each being positioned adjacent the strips 11, while other hinged elements or sections 17 are secured by suitable fasteners 18 to the strips and engage and support the shafts.

By this arrangement it is apparent that the plates 14 are swingingly connected for up and down movement to the strips and when in their lowermost position are supported by the upper edges of the adjacent partitions 10, as indicated. The adjacent edges of the plate 14 are provided with semicircular recesses 19 which are opposed to each other and form an opening of a diameter equal to the exterior diameter of the neck of a conventional form of milk bottle, and this diameter is smaller than the exterior diameter of the usual angular and exterior rib 20 at the mouth of the milk bottle, so that a milk bottle may be inserted in the lower open portion of the compartment and pass through the opening provided by the recesses, the plates moving upwardly to permit of the passing and subsequent to the passage of the ribs 20 of the milk bottles therethrough the bottles are pulled downwardly and are supported by the ribs engaging the upper edges of the plates, as indicated. Suitable means such as coiled springs 21 are disposed about the shafts 16 and have their extremities bearing against the upper surfaces of the adjacent plates and the strips respectively to normally hold the plates downwardly.

Coöperating with the plates are suitable locking members in the present instance in the form of flat springs 23, the body portions of which are secured vertically and medially of the outer surfaces of the end partitions 10 by suitable fasteners 24, while the upper ends are off-set to provide catches 25 which normally lie above the meeting edges of the plates near the outer free ends thereof, the catches of course being spaced from the upper edges of the partitions to permit of a proper seating of the plates. Preparatory to the insertion of a milk bottle the plates rest upon the catches but subsequent to the engagement of the neck of a milk bottle in the opening provided by the recesses 19 the plates move downwardly under the weight of the bottle and also by the catches 25 which are moved outward. Subsequent of course to the seating of the plates on the upper edges of the partitions the catches automatically move forwardly and engage the upper edges of the plates so as to lock the plates.

In use, assuming that the parts have been assembled in the manner described and as indicated in the drawings, especially in Figs. 1 and 3, when it is desired to insert a milk bottle 13, the same is passed through the open bottom of one of the compartments to the casing while the ribbed mouth thereof is passed through the opening provided by the opposed notches 19 and after the rib is passed entirely through the opening and positioned above the plates the milk bottle is released whereupon the under surface of the rib 20 engages the under surface of the plates 14 about the opening and under the action of the weight of the milk bottle the plates move downwardly to force the adjacent spring member 25 outwardly to permit of the seating of the plates on the upper edges of the partitions. Subsequently of course the spring catch engages the plates and locks the plates in closed position. In this connection it is to be noted that the tension of the springs 22 is not sufficient to cause the plates to move in a closed position beyond the catches but merely hold the plates against the catches, that is when the plates are in an open position. To remove the milk bottle the authorized person unlocks a padlock and raises the cover or lid 4, whereupon the desired catch 25 is pressed rearwardly away from the plates while the rib 20 on the milk bottle is engaged and pulled upwardly while the plates spread and permit the passage of the milk bottle between the plates as is apparent.

It is believed in view of the foregoing description that a further detailed description of the operation of the invention is entirely unnecessary. Likewise, it is believed that the advantages of the invention will be readily apparent.

What is claimed is:—

A device of the character described including a casing having an open bottom, flanges extending inwardly from the lower edges of the walls of the casing, a lid hinged to the upper edge of the casing, means for locking the lid in a closed position, an auxiliary support inserted within and supported on the flanges of the casing and embodying spaced partitions, and strips connected to the upper edges of the partitions, said support providing compartments in the casing, opposed pairs of plates hinged to the strips, or upper ends of each compartment and provided with opposed recesses at their meeting edges to form openings, whereby a milk bottle may be inserted through the openings so that its rib at the mouth thereof may be engaged against the upper surfaces of the plates to be supported thereby, the plates being limited in their downward movements by the upper edges of the partitions, and spring catches carried by the end partitions and designed to permit of the seating of the plates against the upper edges of the partitions and also locking the plates against upward movement subsequent to the engagement of the milk bottle therewith.

In testimony whereof I affix my signature.

WILLIAM H. SAUNDERS.